(12) United States Patent
Zaner et al.

(10) Patent No.: US 8,196,051 B2
(45) Date of Patent: Jun. 5, 2012

(54) SHARED ONLINE EXPERIENCE HISTORY CAPTURE AND PROVISION SYSTEM AND METHOD

(75) Inventors: Melora Zaner, Seattle, WA (US); Eun-Kyung Chung, Redmond, WA (US); Geoffrey Elliott, Seattle, WA (US); Heather Ferguson, Centralia, WA (US); Tammy Savage, Seattle, WA (US); Jonathan Sposato, Seattle, WA (US); John Vert, Seattle, WA (US); Joe Walkush, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1409 days.

(21) Appl. No.: 10/770,667

(22) Filed: Feb. 3, 2004

(65) Prior Publication Data

US 2004/0221309 A1 Nov. 4, 2004

Related U.S. Application Data

(63) Continuation-in-part of application No. 10/174,422, filed on Jun. 18, 2002.

(51) Int. Cl.
*G06F 3/00* (2006.01)

(52) U.S. Cl. ........ 715/758; 715/753; 715/856; 715/759; 715/751

(58) Field of Classification Search .................. 715/758, 715/751, 759, 753, 856; 707/104.1
See application file for complete search history.

(56) References Cited

U.S. PATENT DOCUMENTS

| | | | |
|---|---|---|---|
| 5,223,828 A | 6/1993 | McKiel, Jr. | |
| 5,550,970 A * | 8/1996 | Cline et al. | 715/772 |
| 5,793,365 A * | 8/1998 | Tang et al. | 715/758 |
| 5,872,925 A | 2/1999 | Han | |
| 6,100,888 A | 8/2000 | Gourdol et al. | |
| 6,237,025 B1 | 5/2001 | Ludwig et al. | |
| 6,289,372 B1 | 9/2001 | Vyaznikov | |
| 6,484,196 B1 * | 11/2002 | Maurille | 709/206 |
| 6,670,970 B1 | 12/2003 | Bonura et al. | |
| 6,791,583 B2 * | 9/2004 | Tang et al. | 715/751 |
| 7,107,285 B2 * | 9/2006 | von Kaenel et al. | 707/104.1 |

(Continued)

FOREIGN PATENT DOCUMENTS

CA 2324173 A1 4/2001

(Continued)

OTHER PUBLICATIONS

Smith et al., "Conversation Trees and Threaded Chats", Jun. 20, 2000, Technical Report, MSR-TR-2000-43.*

(Continued)

*Primary Examiner* — William Bashore
*Assistant Examiner* — Sherrod Keaton
(74) *Attorney, Agent, or Firm* — Lee & Hayes, PLLC

(57) ABSTRACT

A novel technique automatically stores synchronized group history related to an online group interaction and enables individual group members to later view and access the group history. In an embodiment of the invention, the group history is accessible by group members independently of group interactions at any later time. According to various embodiments of the invention, the group history may be presented in an overview form or a detailed form. With respect to the detailed form, the group history may be presented graphically, such as in an icon timeline or collage, textually, such as in list form, or in any combination of presentation formats. In a further embodiment of the invention, the synchronized group history is writable by group members in addition to being automatically maintained.

17 Claims, 8 Drawing Sheets

U.S. PATENT DOCUMENTS

| | | | |
|---|---|---|---|
| 7,124,164 B1* | 10/2006 | Chemtob | 709/204 |
| 7,281,215 B1 | 10/2007 | Canfield et al. | |
| 7,421,660 B2* | 9/2008 | Charnock et al. | 715/751 |
| 7,519,912 B2* | 4/2009 | Moody et al. | 715/753 |
| 2002/0075305 A1 | 6/2002 | Beaton et al. | |
| 2002/0097267 A1 | 7/2002 | Dinan et al. | |
| 2002/0143876 A1* | 10/2002 | Boyer et al. | 709/205 |
| 2002/0143989 A1 | 10/2002 | Huitema et al. | |
| 2003/0028595 A1* | 2/2003 | Vogt et al. | 709/204 |
| 2003/0028610 A1* | 2/2003 | Pearson | 709/213 |
| 2003/0055892 A1 | 3/2003 | Huitema et al. | |
| 2003/0065721 A1 | 4/2003 | Roskind | |
| 2004/0041836 A1 | 3/2004 | Zaner et al. | |
| 2004/0205091 A1 | 10/2004 | Mulcahy et al. | |
| 2004/0221390 A1 | 11/2004 | Frey | |
| 2004/0243672 A1* | 12/2004 | Markki et al. | 709/204 |
| 2005/0114796 A1* | 5/2005 | Bast | 715/856 |
| 2006/0184886 A1* | 8/2006 | Chung et al. | 715/758 |

FOREIGN PATENT DOCUMENTS

| | | |
|---|---|---|
| WO | WO 00/52887 A1 | 9/2000 |
| WO | WO0133327 A1 | 5/2001 |
| WO | WO0138994 A1 | 5/2001 |
| WO | WO0146942 A1 | 6/2001 |

OTHER PUBLICATIONS

Smith et al., "The Social Life of Small Graphical Chat Spaces", CHI 2000, Apr. 1-6, 2000.*

Vronay et al., "Alternative Interfaces for Chat", 1999, ACM.*

Smith, Marc A., et al., "The Social Life of Small Graphical Chat Spaces," in *Proceedings of CHI 2000*, The Hague, Netherlands, http://research.microsoft.com/scg/papers/vchatchi2000.pdf (Mar. 2000) pp. 1-8.

Cheng, Lili, et al., "Hutchworld: Lessons Learned. A Collaborative Project: Fred Hutchsinson Cancer Research Center & Microsoft Research," *In Proceedings of Virtual Worlds Conference 2000*, Paris, France, http://research.microsoft.com/scq/papers/hutchvw2000.pdf, (Jun. 2000) pp. 1-12.

Kollock, Peter, "The Economies of Online Cooperation: Gifts and Public Goods in Cyberspace," *Communities in Cyberspace*, 1998 http://www.sscnet.ucla.edu/soc/faculty/kollock/papers/economies.htm, pp. 1-17.

Kollock, Peter, et al., "Managing the Virtual Commons: Cooperation and Conflict in Computer Communities," University of California, Los Angeles, http://research.microsoft.com/scg/papers/KollockCommons.htm (1996) pp. 1-20.

Smith, Marc, et al., "What Do People Do in Virtual Worlds? An Analysis of V-Chat Log File Data," University of California, Los Angeles, http://research.microsoft.com/scg/papers/kollockv-chat.pdf (1998) pp. 1-30.

Farnham, Shelly, et al., "Supporting Sociability in a Shared Browser," *In Proceedings of Interact Conference*, Tokyo, Japan, http://research. microsoft.com/scg/papers/sharedbrowsinqinteract.pdf (Jul. 2001) pp. 1-8.

Boyer, "Virtual Social Clubs: Meeting Places for the Internet Community," *Multimedia Computing and Systems*, IEEE International Conference in Florence Italy, pp. 297-301 (Jun. 1999).

Lee et al., "Supporting Multi-User, Multi-Applet Workspaces in CBE," *Proceedings of the ACM 1996 Conference on Computer Supported Cooperative Work*, Boston MA, pp. 344-353 (Nov 1996).

Greenberg, "Collaborative Interfaces for the Web," *Human Factors and Web Development*, pp. 241-253 (1997).

U.S. Appl. No. 10/692,591, filed Oct. 24, 2003.

U.S. Appl. No. 10/693,228, filed Oct. 24, 2003.

Bouvin, "Designing User Interfaces for Collaborative Web-Based Open Hypermedia," in Proceedings of the Eleventh ACM Conference on Hypertext and Hypermedia, San Antonio, TX, 2000, pp. 230-231.

Cugola et al, "Peer-to-Peer for Collaborative Applications," in Proceedings of the 22nd International Conference on Distributed Computing Systems Workshops (ICDS'02), Vienna, Austria, Jul. 2-5, 2002, pp. 359-364.

Dorohonceanu et al, "A Desktop Design for Synchronous Collaboration," in Proceedings of the Graphics Interface '99 (GI'99), Kingston, Ontario, Canada, Jun. 1999, pp. 27-35.

Duhr, "Oberflachenelemente in interaktiven and kooperativen anwendungen," Universitat Oldenburg, Department of Information Systems Thesis, Aug. 2000, 109 pgs.

Garcia et al, "Extending a Collaborative Architecture to Support Emotional Awareness," EBAA '99—Workshop on Emotion-Based Agent Architectures, May 2, 1999, pp. 46-52.

Greenberg et al, "Using a Room Metaphor to Ease Transitions in Groupware," Univeristy of Calgary, Department of Computer Science, Research Report 98/611/02, 1998, 31 pgs.

Gutwin, "Workspace Awareness in Real-Time Distributed Groupware," The University of Calgary, Department of Computer Science, Ph.D. Thesis, Dec. 1997, 272 pgs.

Kindberg, "Mushroom: A Framework for Collaboration and Interaction Across the Internet," in Proceedings of the Fifth ERCIM Workshop on CSCW and the Web, St. Augustin, Germany, Feb. 1996, 11 pgs.

"Microsoft Office's Storage Alternative," Plugged in, Jun. 2001, available at <<http://www.smartcomputing.com/editorial/article.asp?article=articles%2F2001%2Fs1206%2F36s06%2F36s06.asp>>.

Schmidt, "A Generic System for Web-Based Group Interaction," in Proceedings of the Thirty-First Hawaii International Conference on System Sciences, vol. 1, Kohola Coast, HI, Jan. 6-9, 1998, pp. 545-554.

Tang et al, "ConNexus to Awarenex: Extending Awareness to Mobile Users," SIGCHI '01, Mar. 31-Apr. 4, 2001, Seattle, WA, 8 pgs.

Office Action for U.S. Appl. No. 10/174,422, mailed on Sep. 10, 2009, Melora Zaner, "Visual Group Interface for Group Connectivity", 20 pages.

* cited by examiner ns, wherein the shared history is synchronized and is available to each group member. In an embodiment of the invention, the display of the shared history is limited such that only a subset of past transactions is displayed. Through the

SHARED ONLINE EXPERIENCE HISTORY CAPTURE AND PROVISION SYSTEM AND METHOD

RELATED APPLICATION

This application is related to and claims priority to copending U.S. patent application Ser. No. 10/174,422, entitled "Visual Group Interface for Group Connectivity," filed Jun. 18, 2002, of which the present application is a continuation-in-part, and which is herein incorporated by reference in its entirety for all that it teaches without exclusion.

FIELD OF THE INVENTION

This invention relates generally to online group interactions over a network and, more particularly, relates to a system and method for capturing and exposing a history related to one or more online group interactions.

BACKGROUND

Computer technology and the Internet have taken on increasingly important roles in people's lives, and computer users are beginning to expect not only increased productivity, but also increased recreational and personal opportunities. Online group interaction applications have begun to fulfill some of these expectations. One example of such an online group interaction application is given in copending U.S. patent application Ser. No. 10/230,247, entitled System And Method For Shared Integrated Online Social Interaction, filed Aug. 28, 2002, which is herein incorporated by reference in its entirety for all that it teaches without exclusion. Typically, a user accesses the group interaction application via a desktop icon or otherwise on their computer (sometimes referred to as a "machine" or other computing device). Through the application, the user has immediate interactive access to a group of online friends. Group members may engage in a number of shared activities including photograph sharing and viewing, and shared listening of audio material, such as a recitation or recording of interest. In addition, shared chatting, browsing, planning, scheduling, and so on are also desirable to some users. Many other shared activities are possible as well, and although the present description will focus primarily on certain activities, it will be understood that the disclosed principles are applicable to other types of activities, including but not limited to those described in the copending applications identified above.

During a shared activity, the group interaction application ensures that each online member sees the same representation of the shared activity as additions and changes are made. One mechanism for synchronizing the presentation to each member is a peer-to-peer network, although other connection mechanisms, including those with centralized switching or storage, are also usable.

Although such online group interaction applications have increased users' sense of connection and community when interacting via computing devices, the online experience can at times be disjointed and artificial, such as for example when members of a persistent group are not available online at a given point in time. For such occasions, as well as others as will be described, it is desirable to have a mechanism for maintaining a sense of shared history.

BRIEF SUMMARY OF THE INVENTION

The present invention is directed to a technique for automatically capturing a shared history of online group interactions, wherein the shared history is synchronized and is available to each group member. In an embodiment of the invention, the display of the shared history is limited such that only a subset of past transactions is displayed. Through the group history, a user that has been away from the group online activities can catch up with what the group has been doing while the user was away or offline. Essentially, group activities and file sharing are captured to create a sense of group history. In an embodiment of the invention, the history is displayed in such a way as to provide an overview or "pulse" of what has happened in the past. In a further embodiment of the invention, group members can leave things behind for other "away" members via the group history. By automatically recording group events such as group changes, shared activities and shared files, a group can maintain a sense of shared history and build memories together.

Users have several ways of viewing what they have missed, ranging from a general overview of one's entire social network to detailed information of a specific group. For example, three possible view types include a social network pulse view, several group history graphical views, and a group history list view.

History items may be accessible by the viewing user. For example, in an iconic view, clicking on an icon can open the particular history item. Moreover, multiple events may happen within a single activity. Thus, history items can represent a combination of one or more things that happened at a given time. For example, a history item that represents a shared video experience may also include voice comments, graphical comments, etc. made during the video so that the accessing user gets a better sense of the group experience at that time.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

The invention pertains to online group interaction over a computer network and to a novel system and method for maintaining and providing a shared group history. The invention thus operates in a computer environment. In an embodiment of the invention, the described process operates on a collection of one or more computing devices. A suitable computing device usable in implementing all or some aspects of the invention will be first described with reference to FIG. 1, after which a network environment according to particular embodiments of the invention will be more fully described.

Although there are many computing devices suitable for implementing the invention, several exemplary types of computing devices are discussed below with respect to FIG. 1. It will be appreciated that this explanation is given for ease of understanding and is not intended to limit the scope of the invention.

Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
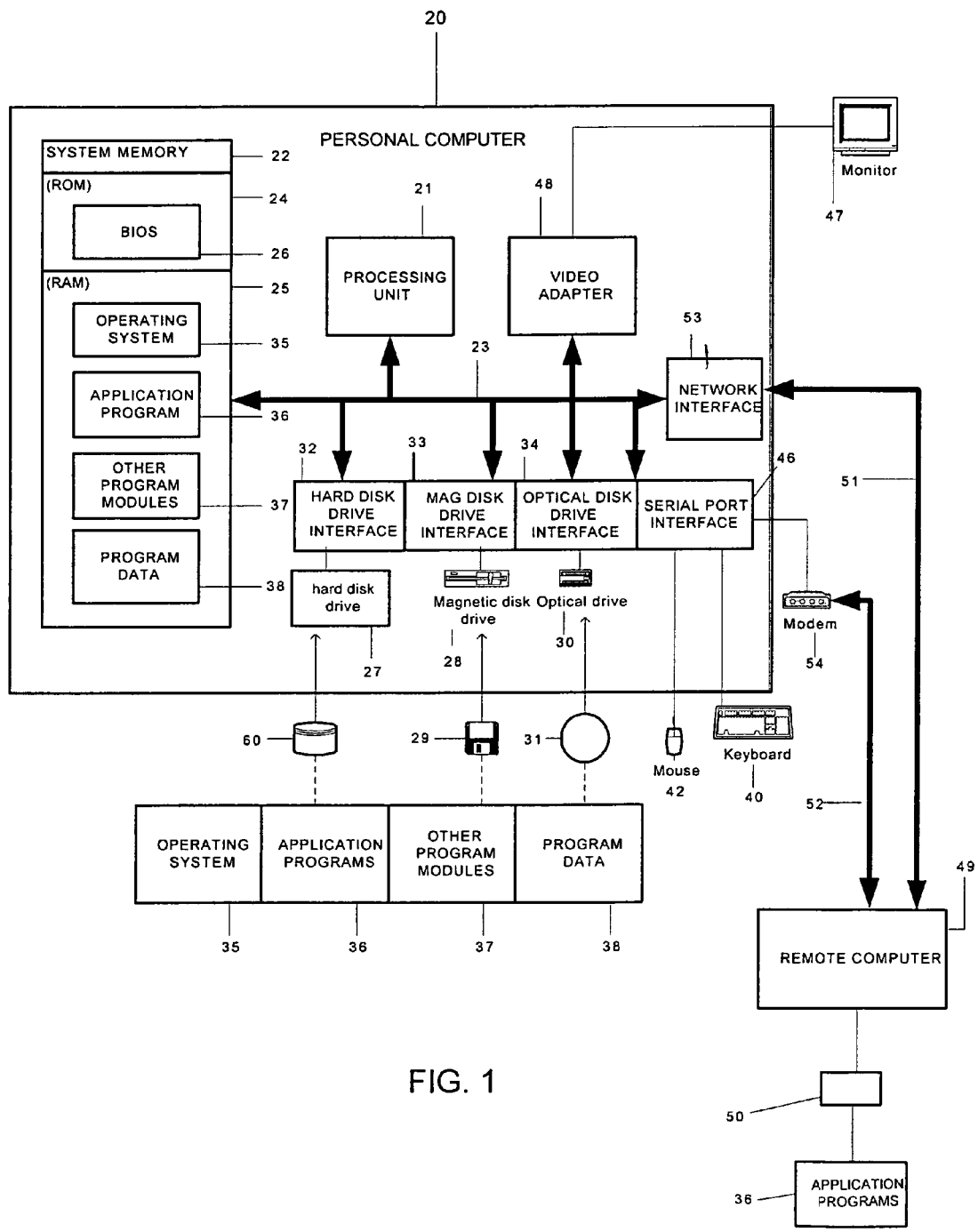
FIG. 1 is a block diagram generally illustrating an example device architecture in which all or a part of embodiments of the present invention may be implemented.

Turning now to FIG. 1, a general purpose computing device is shown in the form of a conventional computer 20, including a processing unit 21, a system memory 22, and a system bus 23 that couples various system components including the system memory to the processing unit 21. The system bus 23 comprises one or more physical busses of any of several types of bus structure including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment. A number of program modules may be stored on the hard disk 60, magnetic disk 29, optical disk 31, ROM 24 or RAM 25, including an operating system 35, one or more application programs 36, other program modules 37, and program data 38.

A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, computers may include other peripheral output devices, not shown, such as speakers and printers.

The computer 20 operates in a networked environment using logical connections to one or more remote computers, such as a remote computer 49. The remote computer 49 may be a domain controller, server, a router, a network PC, a personal computer, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. Program modules depicted relative to the computer 20, or portions thereof, may be stored in the remote memory storage device if such is present. It will be appreciated that the network connections shown are exemplary and other means of establishing a communications link between the computers may be used.

Herein, the invention will generally be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware. In the following discussion, computing devices may be as described above with respect to FIG. 1 regarding computer 20 and/or remote computer 49, or may alternatively have any other type of architecture, design, and/or operation. The computer operations described herein are executed pursuant to reading of computer-readable instruction from a computer-readable medium by a computer or computing device. Computer-readable media include optical, magnetic, electrical and other types of media, as well as storage media, transmission media, and so on.

Figure 2:
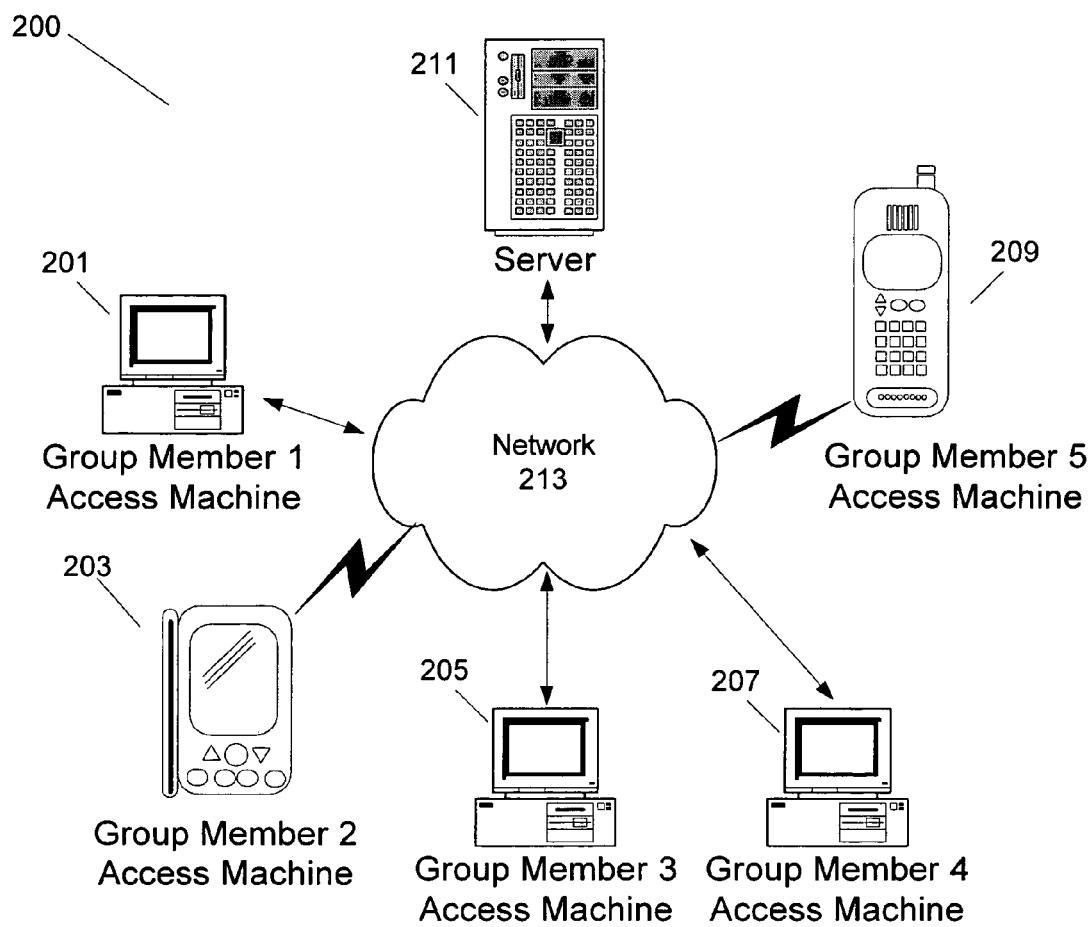
FIG. 2 is a network diagram of an architecture for implementing an embodiment of the invention.

FIG. 2 illustrates in schematic form a network architecture for implementing particular embodiments of the invention, although other embodiments of the invention are not excluded. A number of user computing devices (hereinafter sometimes referred to as computers or machines) are identified as Group Member 1 Access Machine (201), Group Member 2 Access Machine (203), Group Member 3 Access Machine (205), Group Member 4 Access Machine (207), and Group Member 5 Access Machine (209). The user computers 201, 203, 205, 207, 209 are illustrated as connected or connectable to each other via network 213. Note that computers 203 and 209 are illustrated as portable devices, and in particular as a digital assistant and a cell phone respectively, both wirelessly connected to the network 213. The illustrated arrangement is simply an example, and it will be appreciated that all, some, or none of the computers 201, 203, 205, 207, and 209 may be portable and/or wireless.

The computers 201, 203, 205, 207, 209 are used by individual users to interact with other individual users of other ones of the computers 201, 203, 205, 207, 209. Typically, each computer 201, 203, 205, 207, 209 will have running thereon a group interaction application usable to display a representation of a group interaction space, and to update that representation or the representations on other user machines via the network 213. The group interaction application also exposes elements through which the user can interact with the rest of the online group, such as by adding or modifying content, annotating content, communicating with other members, etc.

In addition to the aforementioned components, a server computer 211 is connected or connectable to network 213 in an embodiment of the invention, although it is excluded in an alternative embodiment of the invention. One purpose of the server computer 211, when used, is to store the state of the group, e.g., networking data, membership data, etc., and/or to store group data, e.g., shared content, projects, etc. In the alternative embodiment of the invention wherein the server 211 is not used, the network 213 is a peer-to-peer network, with the state of the group and the group data being stored on the member machines 201, 203, 205, 207, 209. Note that although five machines and one server are illustrated, this configuration is simply an example, and any number of machines and/or servers, when used, may be included. Furthermore, although the network is illustrated in a manner often associated with large switched networks, any type of networking technology may be used. Furthermore, in a peer-to-peer network, certain computers may only be able to access other computers by going through an intermediary, which may or may not be one of the group member access machines.

Figure 3:
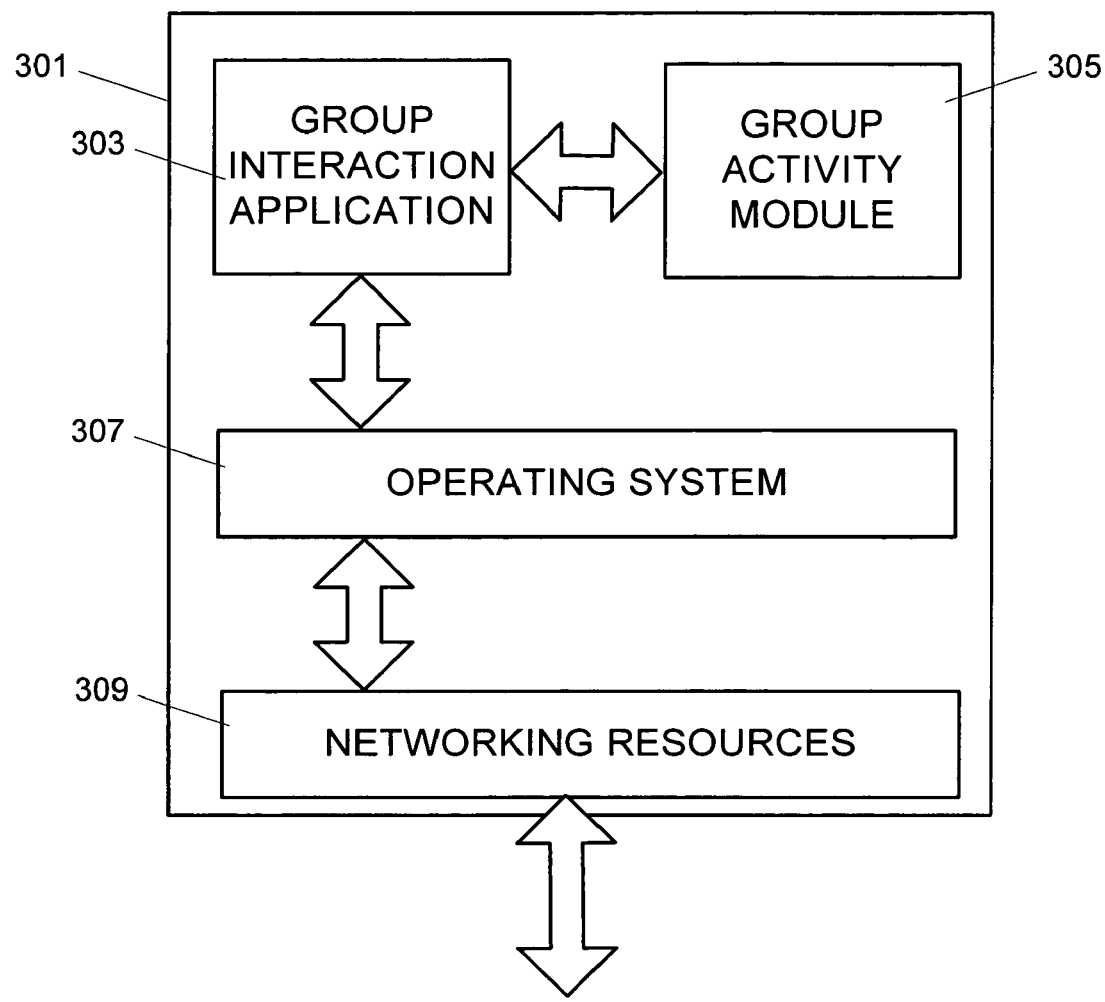
FIG. 3 is a schematic illustration of a group interaction application environment usable to implement embodiments of the invention.

Referring to FIG. 3, the group interaction application 303 resides in active computer memory 301 with a group activity module 305, an operating system 307, and networking resources 309 for the computer. The group interaction application 303 interacts with the group activity module 305 to determine what content to display at any given moment to the user of the particular computer. In addition, the group interaction application 303 uses the networking resources 309 via the operating system 307 to communicate with other user machines, such as for sharing data, including history data or updates, and synchronizing the user views. The history maintenance, synchronization, and display steps described hereinafter are performed in an embodiment of the invention by one or both of the group interaction application 303 and the group activity module 305. The peer-to-peer infrastructure may be provided by the operating system 307 in an embodiment of the invention, but such is not required.

A sense of group history is important for users in enriching relationships, building memories and helping users feel connected at all times no matter how many group members are, or are not, online. In various embodiments of the invention, users are provided with different ways of viewing what they have missed from online interactions, from a general overview of one's entire social network down to detailed information regarding a specific group. Three possible views discussed below include a social network pulse view, a group history graphical view, and a list view, as well as combination views.

Figure 4:
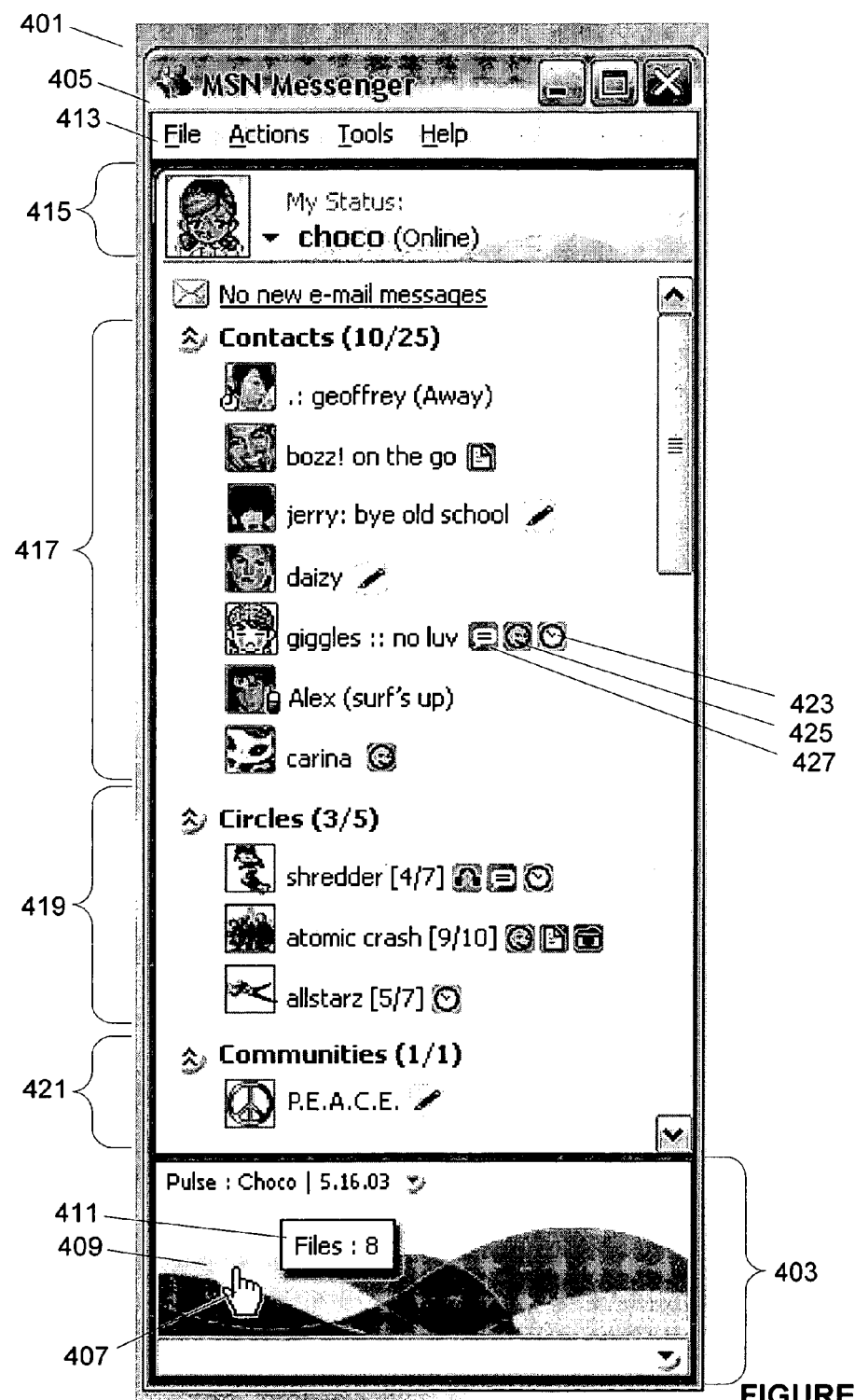
FIG. 4 is a representation of a user interface wherein a history or pulse visualization is displayed at the lower portion of a contact bar according to an embodiment of the invention.

FIG. 4 shows a representation of an example user interface 401 according to an embodiment of the invention, wherein a history or pulse visualization 403 is displayed at the lower portion of Messenger Contact Bar or other contact bar 405. Users can get a general overview of everything that they have missed (potentially limited according to policy, as discussed herein) from all groups through this visualization 403. By rolling the cursor 407 over different colors or shapes in the visualization, users can see how many files, winks (a quick online greeting, etc.), messages, etc. they have received overall from everyone on their contacts list or messenger bar 405 during the day. In particular, each separate shape in the history visualization corresponds to a different type of online transaction, such as those mentioned above. The shapes may be a different colors in an embodiment of the invention to help the user distinguish them.

In the illustrated example, the cursor 407 has been rolled over a particular one 409 of the shapes in the history visualization section 403. The selected shape 409 corresponds to files received in the particular example, and thus a pop-up box 411 shows the exact number (e.g., 8) of received files for a particular period, such as since the user was last online. Note that in an embodiment of the invention, the size, shape, and/or extent of each shape is modified to reflect the number of transactions in the associated category. For example, in the illustrated interface 401, the shapes are waveforms. In an embodiment of the invention, the height, length and/or area of a wave may be increased or decreased proportionately relative to the other waves to reflect a greater or lesser number of transactions of the type associated with the wave. Thus, the illustrated overview or "pulse" view allows the user to quickly get a general sense of the type and quantity of missed transactions so that they can decide whether to check the group history, or whether to spend more or less time online. In addition, the overview provides a quick measure of popularity, in that a greater number of missed transactions would indicate a greater degree of interest in the other group members in getting in touch with the particular user. Mechanisms for tracking missed transactions are discussed below with reference to FIG. 8. In an embodiment of the invention, the history visualization portion 403 of the bar 405 can be "undocked" from the bar and expanded to show in greater detail what the user has missed over a longer period such as the past several days or weeks.

Before discussing further embodiments of the invention, other features of the user interface 401 will be briefly discussed for ease of understanding and later reference. In particular, the user interface 401 further comprises in an embodiment of the invention a menu bar 413, a user area 415, a contacts area 417, a "circle" or groups area 419, and a "communities" area 421. The user area 415 is usable to display and control the status of the user, e.g., "online," "offline," etc. The particular user may be online with respect to a network generally without being "online" with respect to one or more groups. The contacts area 417 displays the names and icons of one or more currently online contacts, i.e. individual entities, and the "circle" or groups area 419 displays the names and icons of one or more currently online groups, i.e. small (around 5-10 members) distinct groups of individuals, at least one of whom is online currently. Finally, the "communities" area 421 displays the name and icon associated with any currently online community, i.e., a large distinct groups of individuals, at least one of whom is online currently. While the terms "group" and "circle" are synonymous herein, whereas the term "community" implies a larger collection, the distinction between groups (or circles) and communities is not important herein, and the term "group" when used will refer to any of the above. In the illustrated example, any group icon may be associated with specific status icons such as elements 423, 425, 427. Of particular interest herein is an icon such as icon 423 which indicates that the associated group has recent history for the user to view.

Although the pulse view is a quick and convenient way for the user to get an overview of their social situation, the user may wish to view specific transactions associated with specific groups or contacts rather than to just get an overview of how much activity has occurred generally. In an embodiment of the invention, the user clicks on (e.g., right-clicks a mouse with cursor suitably positioned) the group icon and selects a "history" option from a menu to access and view more information. Group history encompasses information like changes to the group (who has joined or left the group), snapshots of shared activities like photo sharing and shared listening activities, messages etc. sent to the group and any files being shared.

In an embodiment of the invention, all such items related to group activity are automatically recorded and saved as group history via mechanisms such as those discussed below with reference to FIG. 8. Over time, items may expire according to an embodiment of the invention, or users may be able to delete items as needed according to another embodiment of the invention. If a user has been away or offline, they will get a notification that a new item has been recorded in the group's history in an embodiment of the invention. Double clicking any item shown in the group history will open the file in the appropriate group activity according to an embodiment of the invention. For example, photographs are automatically opened in the photo sharing module or application in which they originally were shared.

Figure 5:
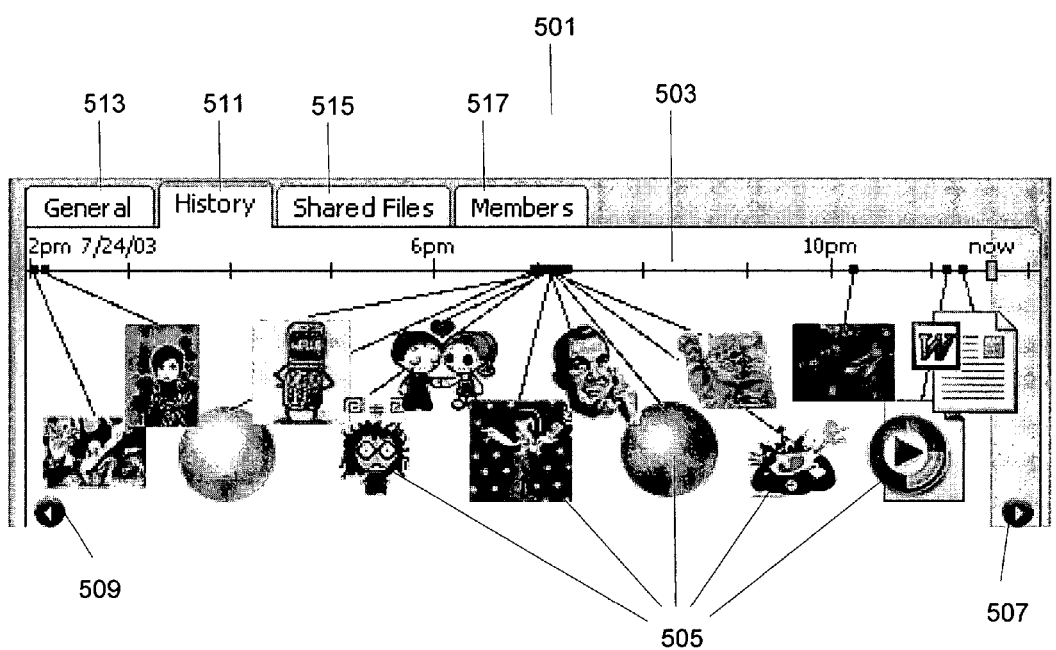
FIG. 5 is a representation of a user interface showing a timeline view of group history with group activities and shared files shown in clusters around particular times according to an embodiment of the invention.

There are a number of ways in which to display the group history information according to various embodiments of the invention. There are both graphical and textual formats. One graphical format for presenting the group history information according to an embodiment of the invention displays a visual snapshot of the most recent events and files that the group has shared in either a timeline view or in a collage manner similar to a corkboard in a dormitory room. An exemplary timeline view according to an embodiment of the invention is illustrated in the user interface of FIG. 5. In particular, the interface 501 includes a timeline 503 representing a period of time. In the illustrated example, the timeline includes the present time. User selectable actuators 507, 509 are usable to scroll the timeline to view a different time frame. A number of icons such as those labeled 505 are tied to the timeline 503 via lead lines so that the user can see when the particular items arose or were shared. In an embodiment of the invention, the icons include both sent and received transactions. For example, a file that the user has shared and a file that the user received will both be represented by icons in the interface 501. In an embodiment of the invention, the icon 505 itself is adapted to convey the nature of the history item. For example, photographs may be represented by thumbnails of the actual picture, and text documents may be represented by the icon associated with a text editor, such as the Word® program produced by Microsoft® Corporation of Redmond, Wash.

Note that in the illustrated embodiment of the invention, the group history is accessed via a tab 511 in a group manager interface for a particular one of the user's groups. Other tabs available within the manager, if any, may include such things as general group information (tab 513), available shared files (tab 515), and a listing of group members (tab 517).

Figure 6:
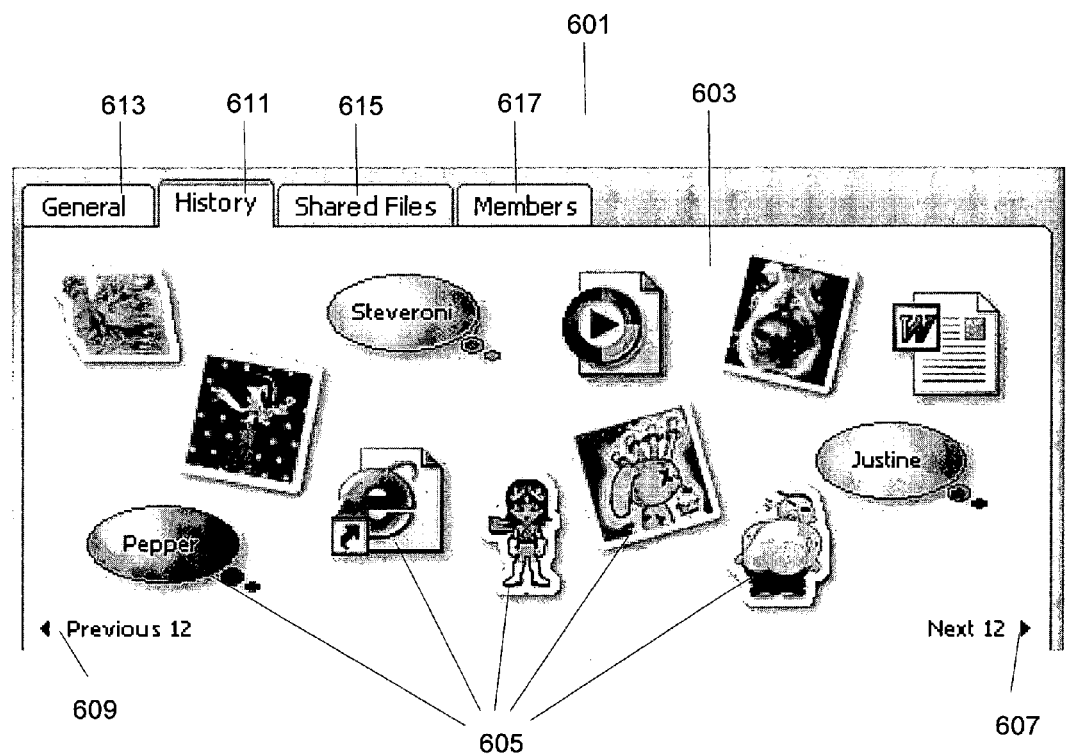
FIG. 6 is a representation of a user interface showing a collage view of group history according to an embodiment of the invention.

An alternative "collage" view of history items for the group is shown in FIG. 6. In the collage view, the user interface 601 has a space 603 within which various icons such as those labeled 605 are displayed. As with the timeline view, the icons represent items of group history and the aspects and embodiments discussed with respect to FIG. 5 apply as well to FIG. 6. The icons 605 may appear in time order, or may be generally but not precisely time-ordered. As with the interface 501, several tabs 611, 613, 615, 617 may be available to access various types of information regarding the group. In addition, selectable actuators 607, 609 similarly facilitate user access to different time frames.

In an embodiment of the invention, items shown in the interfaces 501, 601 are filterable by type or number. In addition, tool tips may be displayed in an embodiment of the invention whenever the user rolls over an item 505, 605 to provide additional information such as file type, date/time sent and group member. By having a graphical view of items, the experience is more tangible and enjoyable since users can quickly see how much they have missed.

While having a graphical presentation of recent events and items shared is a fun experience, over time users may need a more efficient and precise way of managing the group history. To meet this need, a list view of all events and shared files gives users a familiar management tool. In particular, the list view organizes items in the list by properties such as filename, type, date/time, and user. By clicking on the name of an item in the list view, the item is expanded to display to the user additional information and/or to display user tools for acting on the items with such operations as save, view, or delete.

Figure 7:
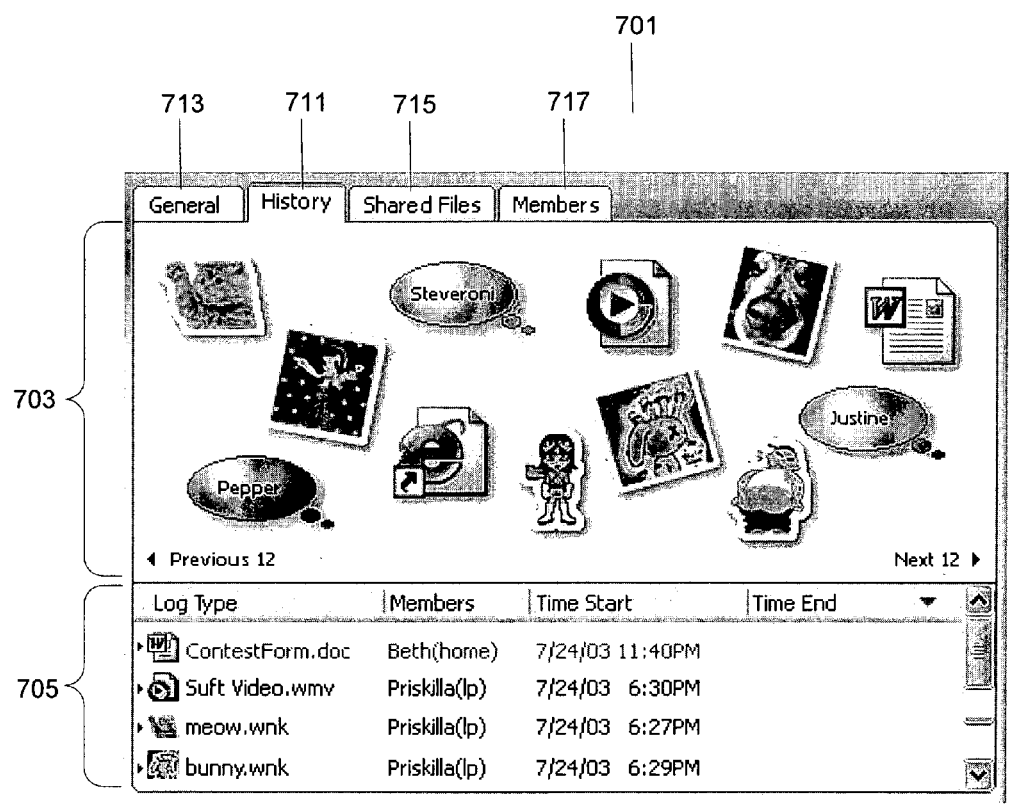
FIG. 7 is a representation of a user interface showing a combined graphical and list view of group history according to an embodiment of the invention.

In an embodiment of the invention, a user can select which type of view, graphical or list, they desire. A user-selectable actuator is provided for this purpose in an embodiment of the invention. However, in a further embodiment of the invention, a graphical view is combined with a list view in a single screen. Such an embodiment of the invention is shown in FIG. 7. In particular, the user interface 701 comprises a graphical view area 703 and a list view area 705. The graphical view area 703 appears and functions as described above with respect to either of FIGS. 5 and 6 or otherwise. The list view area 705 appears and functions in the same manner as described above for the stand-alone list view. Note that the group history may, in this embodiment of the invention as well, be available via a tab 711 in the group manager interface, with other tabs 713, 715, 717 being selectable as well.

Figure 8:
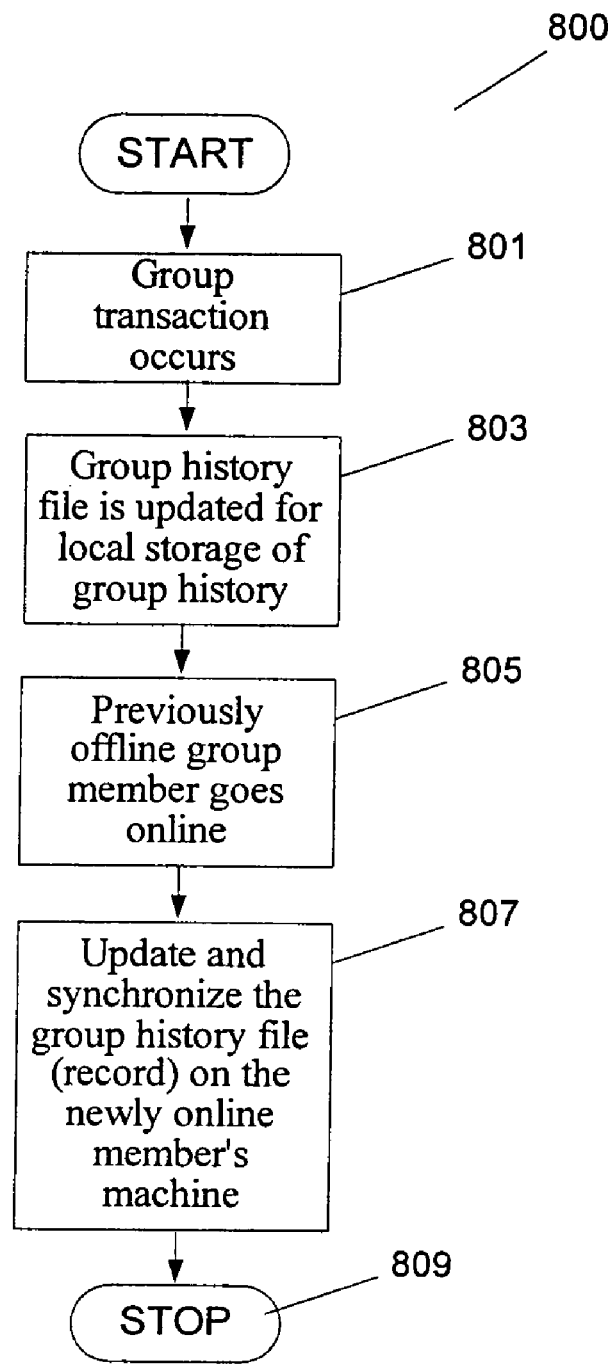
FIG. 8 illustrates a flow chart showing steps according to an embodiment of the invention for collecting group history.

FIG. 8 illustrate a flow chart of steps taken in an embodiment of the invention to collect group history for later display and access as described above. In particular, at step 801, a group transaction occurs. Note that the user who will later view the history need not be online at this time, and indeed, the group transaction may be by a single online group member, such as in sending a greeting to the group members, etc. At step 803, a group history file for each online group member is updated for local storage of group history. The local group history file comprises one or more peer-to-peer records in an embodiment of the invention, the peer-to-peer records being automatically updated as events occur according to the ordinary function of a suitable peer-to-peer technology such as "Windows Peer-to-Peer Networking" technology. In addition, for each event, such as a photo sharing session or a video sharing session, an indication of each participating member's identity (userid, name, address, etc.) is stored in the local group history file to facilitate later evaluation of which events a user missed.

In addition, the expiration date/time of each record is set via the functions supplied for this purpose in the peernet or other peer-to-peer infrastructure technology. With respect to the particular expiration data/time, this is a matter of application policy. For example, greetings and other minor and/or common occurrences may be given a shorter lifetime than major interactions such as media sharing sessions. With respect to peernet, an absolute expiration date/time for each history item is calculated by adding the desired time-to-live to the current date/time.

All such records are synchronized between online group member machines during the session. In an embodiment of the invention, the group history file is also updated at a central server if such is used.

Note that as discussed above some group members may not be online at the time that the transaction occurs. Thus, at step 805, a previously offline group member goes online, and at step 807 the peer-to-peer or other infrastructure is used to update and synchronize the group history file (e.g., record) on the newly online member's machine. For example, as will be appreciated by those of skill in the art, peernet provides functions specifically for updating records when a member comes online (e.g. PeerGraphUpdateRecord), and such are preferably used to perform this step. The update information may originate from another member machine in the peer-to-peer architecture, or from a central server if such is used. In the latter embodiment of the invention, a particular user may receive a history update even when no other member is online.

At step 809, the process terminates. As a result, a synchronized group history related to online group transactions is maintained and is accessible. The group history information so maintained is available to users, e.g., via a user interface as discussed above. Note however, that for a given user some history items may not be displayed. For example, even though each member has on his or her machine the same group history file once synchronization for each member has occurred, it may be desirable to limit some or all members' access to certain information. For example, it may be desirable as a matter of policy to show only those non-expired items that occurred after the particular user became a member. This limitation is enforced locally by the group interaction application or other application when presenting the group history.

With respect to the "pulse" view of missed transactions, the local group interaction application or other application determines which events represented in the synchronized peer records (e.g. group history file) were missed by the particular user. In order to do this, the indications of member identity that have been placed in the records as discussed above are examined. If the particular user's identification is not represented in a given record, then this indicates the user was not a participant in the particular activity represented by the record.

Through the group history, members who were offline when an online group interaction transaction occurred can maintain a sense of belonging and community. Moreover, members who were present during the transaction(s) in question can also use the group history to relive the online group activity or to review items of interest. In an embodiment of the invention, the group history is exposed and treated as a "Group Space," e.g. a shared online corkboard. In this embodiment of the invention, the group space is not only readable by users, but is also writable by users. That is, in addition to the automatic population of the group history data as discussed above, users can also directly place items into the group history for others to see now or later, much like a corkboard. The interface for such interaction is as described above in an embodiment of the invention, with the additional understanding that files may also be placed in the history, such as by dragging and dropping into the space (e.g., 503, 603, 703, 705). Thus, for example, group members can use the group history in order to leave each other artifacts. Members can add a sticky note, magnetic poetry, stickers, or browse their files to share tools attached to the corkboard. Members can drag and drop any type of document or file onto the "corkboard" (group history user interface) including photos, text documents, memory cubes, sound files, etc. and determine actual placement and rotation on the board. Files appear as a default file type icon in an embodiment of the invention, or as thumbnails in an alternative embodiment of the invention.

It will be appreciated that an improved system and method for maintaining and accessing a shared group history for an online group interaction application have been described. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. In addition, the illustrated user interface elements may be modified in arrangement, appearance, content, extent etc. within the invention. Therefore, the invention as described herein contemplates all such embodiments as may come within the scope of the following claims and equivalents thereof.

We claim:

1. A method of providing a shared history of transactions occurring between two or more members of an interaction group, each member of the interaction group being associated with a respective member machine for interacting with one or more other members through their respective member machines over a network, the method comprising:
   observing a plurality of different types of transactions between two or more members of the interaction group;
   automatically storing references to the plurality of different types of transactions in a group history file;
   synchronizing the group history file for the respective member machines;
   presenting user-selectable options for displaying a summary of the group history file, the user-selectable options comprising:
      a group history timeline view that displays, via a temporal configuration, the summary of the group history file as distinct visual icons for the different types of transactions observed; and a group history collage view that displays, via a collage configuration, the summary of the group history file as distinct visual icons for the different types of transactions observed; and in response to a user-selected option, displaying the summary of the group history file to a member via a display device of a member machine, the summary of the group history file being configured to:

serve as a group space for the members of the interaction group that is writeable by the members, enabling the members to place items on the summary of the group history file for viewing by other members; and visually distinguish between the different types of transactions the members missed during an offline period.

2. The method according to claim 1, wherein:
the user-selected option is the group history timeline view; and
displaying the summary of the group history file visually conveys a respective occurrence time of each transaction.

3. The method according to claim 2, wherein each distinct visual icon is active such that user-selection of the distinct visual icon causes more information regarding a respective transaction to be displayed.

4. The method according to claim 1, wherein:
the user-selected option is the group history collage view; and
displaying the summary of the group history file visually resembles a collage of physical items.

5. The method according to claim 4, wherein each distinct visual icon is active such that user-selection of the distinct visual icon causes further information regarding a respective transaction to be displayed.

6. The method according to claim 1, wherein each transaction is selected from a group of different transactions types comprising:
a shared video experience;
a voice comment;
a graphical comment;
a photo sharing experience;
a shared listening activity;
chatting;
browsing;
planning; and
scheduling.

7. The method according to claim 1, wherein at least one transaction represented in the summary of the group history file comprises an activity having multiple events.

8. One or more computer-readable storage media comprising computer executable instructions that, when executed by a processor, perform the method according to claim 1.

9. A method comprising:
under control of one or more processors configured with executable instructions:
detecting a plurality of transactions for an interaction group, the plurality of transactions originating from one or more members with online network access to an interaction group;
automatically storing a reference for each of the plurality of transactions in a group history file, the group history file serving as a writeable group space for members of the interaction group thereby enabling the members to share information and place items associated with the plurality of transactions and to distinguish between transactions missed during an offline period;
in response to observing that a previously offline member currently has online access to the interaction group, synchronizing the group history file on a machine of the previously offline member;
providing options to the previously offline member for displaying a summary of the group history file, the options including:
a group history timeline view that displays, via a temporal configuration, the summary of the group history file as distinct visual icons for different types of transactions detected; and
a group history collage view that displays, via a collage configuration, the summary of the group history file as distinct visual icons for the different types of transactions detected;
receiving an indication of a user selected option; and
configuring one of the group history timeline view or the group history collage view for display based at least in part on the user selected option.

10. The method according to claim 9, wherein the distinct visual icons are distinguishable by color.

11. One or more computer-readable storage media comprising computer executable instructions that, when executed by a processor, perform the method according to claim 9.

12. The method according to claim 9, wherein the different types of transactions detected are selected from a group comprising:
a shared video experience;
a voice comment;
a graphical comment;
a photo sharing experience;
a shared listening activity;
chatting;
browsing;
planning; and
scheduling.

13. The method according to claim 9, wherein at least one transaction in the group history file comprises an activity having multiple events.

14. A method comprising:
under control of one or more processors configured with executable instructions:
detecting that a previously offline member currently has online access to an interaction group;
accessing a server to synchronize a group history file on a machine of the previously offline member, the group history file being configured to:
serve as a writeable group space for members of the interaction group thereby enabling individual members to place items in the group history file for viewing by other members in the interaction group;
store references to a plurality of transactions respectively associated with the placed items; and
distinguish between different types of transactions the previously offline member missed during an offline period;
providing options to the previously offline member for displaying a summary of the group history file, the options including:
a group history timeline view that displays, via a temporal configuration, the summary of the group history file as distinct visual icons for different types of transactions detected; and
a group history collage view that displays, via a collage configuration, the summary of the group history file as distinct visual icons for the different types of transactions detected; and displaying the group history timeline view or the group history collage view based at least in part on a user selected option.

15. The method according to claim 14, wherein each of the plurality of transactions are selected from a group comprising:
- a shared video experience;
- a voice comment;
- a graphical comment;
- a photo sharing experience;
- a shared listening activity;
- chatting;
- browsing;
- planning; and
- scheduling.

16. The method according to claim 14, wherein at least one transaction in the group history file comprises an activity having multiple events.

17. One or more computer-readable storage media comprising computer executable instructions that, when executed by a processor, perform the method according to claim 14.

* * * * *